G. E. KIRK.
ELECTRICAL TEMPERATURE READER AND RECORDER.
APPLICATION FILED JUNE 26, 1907.

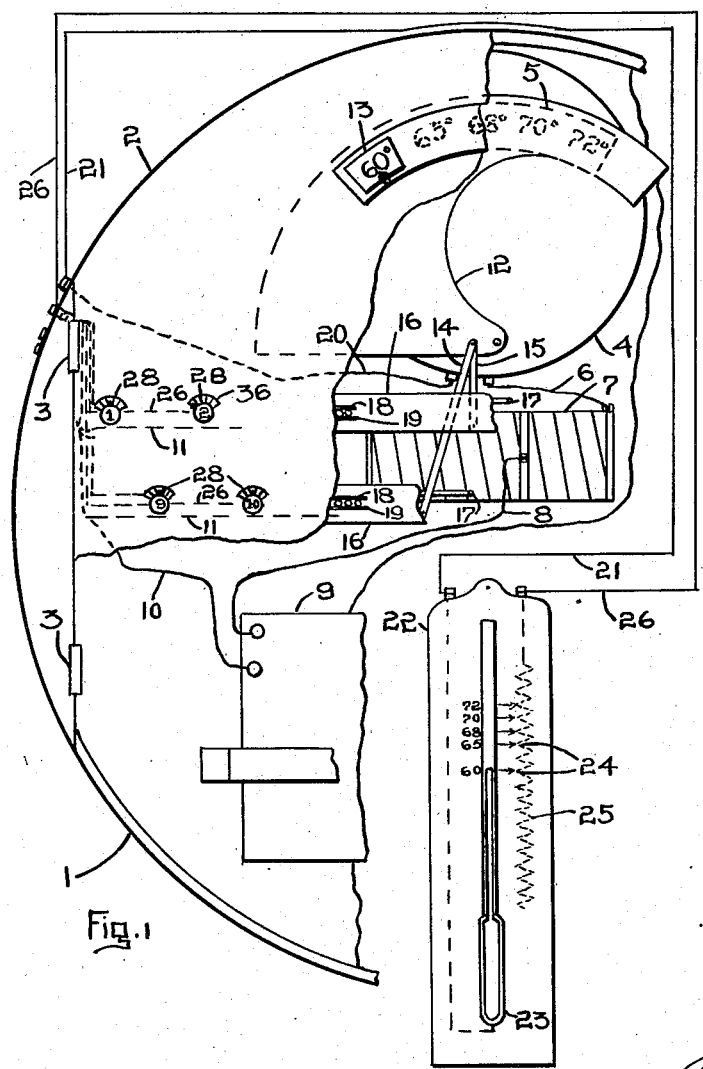

905,326.

Patented Dec. 1, 1908.
2 SHEETS—SHEET 2.

WITNESSES
M E Kirk
Hazel Kirk

INVENTOR
Geo E Kirk

UNITED STATES PATENT OFFICE.

GEORGE E. KIRK, OF TOLEDO, OHIO, ASSIGNOR TO WILLIAM A. BAKER, OF TOLEDO, OHIO.

ELECTRICAL TEMPERATURE READER AND RECORDER.

No. 905,326.  Specification of Letters Patent.  Patented Dec. 1, 1908.

Application filed June 26, 1907. Serial No. 380,873.

*To all whom it may concern:*

Be it known that I, GEORGE E. KIRK, a citizen of the United States, residing at Toledo, in the county of Lucas and State of Ohio, have invented a new and useful Electrical Temperature Reader and Recorder, of which the following is a specification.

This invention relates to determining, reading and recording conditions at a remote point or points.

This invention has utility when adapted to temperature control as in public buildings, schools, and in various cooking, brewing and drying operations.

Figure 4:
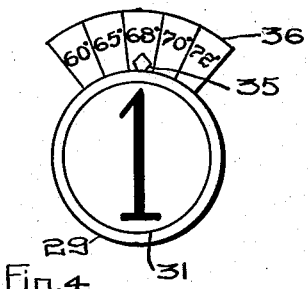
Figure 5:
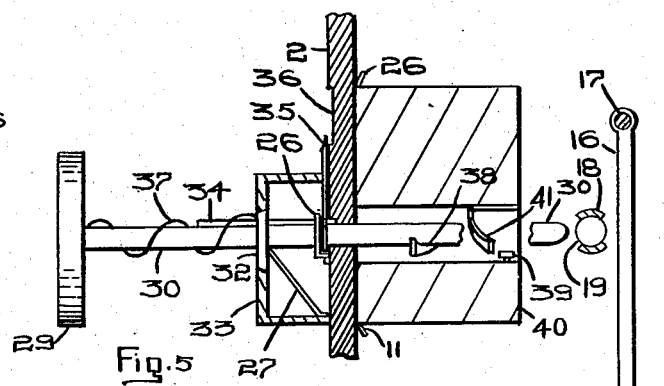
Figure 6:
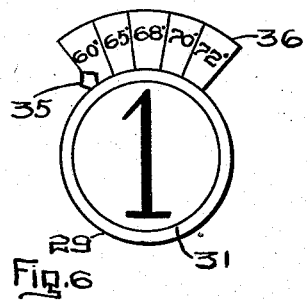
Figure 7:
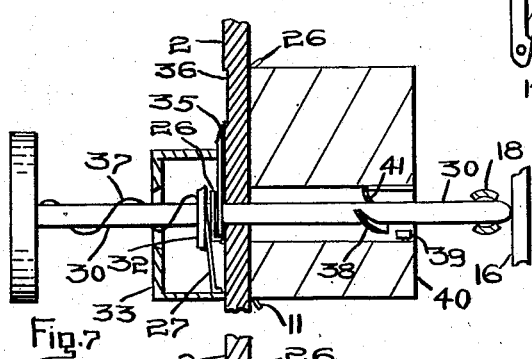
Figure 8:
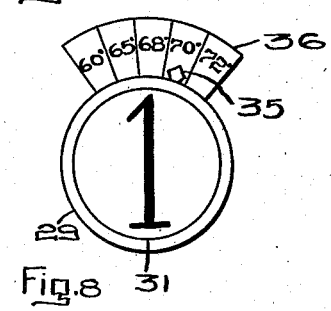
Figure 9:
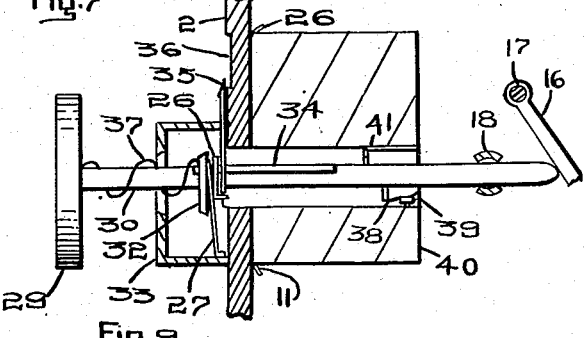

Referring to the drawings: Figure 1 is a fragmentary view in elevation with parts broken away of an embodiment of the invention for determining by means of an electric circuit remote temperature, reading and recording the same; Fig. 2 is a vertical central section of the central station portion of the instruments shown in Fig. 1; Fig. 3 is a showing of electric circuit as used in Figs. 1 and 2; Fig. 4 is an end elevation and Fig. 5 a side view on an enlarged scale of switch, recorder and actuating member therefor, the switch being open; Figs. 6 and 7 respectively correspond with Figs. 4 and 5, with the parts moved to just close the switch; and Figs. 8 and 9 show the later stage of movement to the reading to be recorded.

The central station instruments are housed in frame 1 which may be conveniently placed for access thereto say by the fireman. This frame 1, has on its front a door 2, hinged at one side by hinges 3 to the frame. In the upper rearward part of this circular frame 1 is fixed electrical measuring instrument 4, which may be an ammeter, having scale 5, in this instance graduated to read temperature direct. Conductor 6 connects one terminal of indicating instrument 4 with resistance 7 carried by the frame. A band adjustable to vary resistance 7, has conducting wire 8 extending to source of electrical energy, herein shown as a battery 9 also mounted in the frame 1. Lead 10 from the battery 9 has branches 11.

Pivotally carried on front portion of instrument 5 is screen 12 having opening or transparency 13 therein. This screen is actuated by links 14 and 15 connected to slats 16 pivotally mounted on rods 17 carried by the frame 1. Ways 18, also carried by frame 1, adjacent slats 16 have movable therein a series of balls 19. Screen 12 and connected parts are so designed as to normally hold opening 13 in position just before first reading on scale 5, so that swing of slat 16 back will move opening 13 to any point on scale 5. From a second terminal on electrical instrument 4 line 20 leads to terminal on frame 1, from which a wire 21 may extend to a remote room to temperature measuring instrument or thermometer 22, where it has electrical contact through the glass tube 23 to the mercury therein. Various electrical contacts 24 extend into the tube 23 as desired, and are in circuit according to position of the mercury, thus producing an automatic temperature controlled instrument. These contacts 24 are adjustable to positions along resistance 25 to properly step the current flow for instrument 4, the scale of which corresponds to readings of temperature measuring instrument 22 at the contacts 24. From the resistance 25, wire 26 extends to frame 1, and through terminal thereinto to be connected by switch 27 and complete circuit through branch 21, 23, 24, 25, 26 and main trunk or section 20, 4, 6, 7, 8, 9, 10, 11. Manual actuation of switch marked say for room 2 will automatically select the shunt to such room, simultaneously completing the circuit which has but this single manually controllable break, thus at once giving reading of temperature measuring instrument on indicating instrument at central station.

By operating push 28, which has some designation thereon to indicate position of thermometer to which it is connected, such circuit is closed. This push 28, has outer rim 29 fixed to stem 30. Seated in the rim 29 and relatively movable is the center piece 31. Loosely mounted on stem 30 is collar 32 normally held by spring switch 27 against seat in housing 33.

The recording device is actuated from stem 30 which has spline 34 thereon engaging recording element 35 to position this element or pointer 35 on scale 36 having readings similar to scale 5 of instrument 4. About stem 30, between head 29 and collar 32 is coil spring 37 which is sufficiently stiff to close spring switch 27 during first inward movement of head 29 of the push button. After closing switch 27, continued movement of push inward causes scroll 38 thereon to engage roller 39 carried by block 40, causing rotation of stem 30 and such positioning of recording means 35 as the inward movement determines. Upon release of the push it is non-rotatively thrown directly back by springs 27, 37, the guide scroll 41 in block 40 yielding to this travel of scroll 38, thus leaving pointer 35 to record the reading made. In taking next reading, that movement of push which closes switch 27 sets pointer 35 off scale 36 as scroll 41 guides scroll 38 toward roller 39.

Operation—Should it be desired to obtain temperature reading at remote place where is positioned thermometer numbered 1, the last reading at that place having been 68°, see Fig. 4, push No. 1 is pressed, and in movement to close switch, see Fig. 7, simultaneously shifts pointer 35 off scale 36, see Fig. 6. This switch 27 closes and by the single movement completes circuit to thermometer No. 1, causing needle of instrument 4 to move along scale 5 to a reading corresponding to position of mercury as to contacts 24 in the thermometer No. 1. In Fig. 1, the parts are in position for taking and recording 60° reading in room No. 2, or of thermometer No. 2, the continued inward movement of the push through 16, 14, 12 to bring opening 13 over instrument needle, causes rotation of rod 30 through cam or scroll 38 and roller 39, to position pointer 35 on scale 36 for thermometer No. 1. In Figs. 8 and 9, the reading for thermometer No. 1 is being taken at 70°. The record of the previous temperature, used in connection with the reading being taken, enables fireman or attendant to determine whether conditions at remote point are constant or fluctuating, and if the latter, in which direction and how much, and action to govern such condition may be taken accordingly.

The operation as discussed is automatic, and a most valuable guide in temperature control from a central station. However, by disconnecting or omitting the screen 12 and connections 14, 15, 16, 17, a reading and recording may still be had by pressure on push to close switch 27, then rotation of head 29 to position recording element 35 to correspond with reading indicated by needle on scale 5 of instrument 4. That movement of stem 30 which closes switch 27, causes travel of end of stem 30 between ways 18 to so move balls 19 therein as to completely fill the other portions of the ways, thereby preventing movement of any other push even so far as to close a switch 27, so but a single thermometer circuit may be closed at a time and no mixing or confusion of readings can occur. The movement of stem 30 after passing through this locking means contacts a slat 16 and causes the slat and corresponding link 14 or 15 to oscillate screen 12 until needle is found on scale 5, the stem 30 meanwhile being slightly rotated through cam or scroll 38 to give the same reading on secondary scale 36.

Individuals who have duties in which such a construction as this is installed will appreciate that with but one hand and a single operation results may be directly obtained, telling not only what condition exists but what to do—furnish more cold air, more hot air or let supply remain as it is. This accurate knowledge of what the source of heat must do, makes possible a maximum of economy in fuel consumption. The previous reading and the one being taken are compared by the operator without necessity of pencil to get lost or paper to dirty, accompanied with trouble of recording, the machine herein being an effectual preventive against wrong recording. For compactness, simplicity, effectiveness and great reliability, this machine has made a marked advance in a field of reading and recording instruments and its utility has attained for it a recognized high standing. Rotation of head 29 may effect the movement of pointer 35 to initial setting and to recording positions, notwithstanding the presence of scrolls which can automatically bring this about.

What is claimed and it is desired to secure by Letters Patent is:

1. A temperature reader and recorder having a single variable resistance, an indicating instrument and a temperature measuring instrument capable of producing a variation in the resistance, a circuit connecting said instruments and resistance, a switch for opening and closing the circuit, and manually operable means adjacent to and including an element controllable simultaneously with the switch coöperating to record the various readings through change in the resistance as affecting the indicating instrument.

2. A temperature recorder having in circuit a temperature measuring instrument, a second instrument controlled by the temperature measuring instrument, a switch for the circuit, a recording device, and switch closing means movable to actuate the device and record condition of second instrument as affected by temperature measuring instrument.

3. A temperature recorder having in circuit a temperature measuring instrument, an indicating instrument, a recording element, and a reciprocable member movable to effect closing of the circuit, there being connections between the member and the recording element to position said element.

4. A temperature recorder comprising a plurality of remote temperature measuring instruments, circuits, a device susceptible of variation to determine condition of a temperature measuring instrument, recording elements, switches, and members movable to operate the different switches to close the circuit selected and to actuate the corresponding recording element to record the reading of a temperature measuring instrument as determined by the device.

5. A temperature reader and recorder for a plurality of remote places comprising an electrical conducting section, an indicating instrument therein, a branch for each remote place, an automatic temperature controlled instrument in each branch, a manually actuable element for each branch completing a circuit with the section to give reading of the temperature instrument on the indicating instrument, and recording means operable with the manually actuable element.

6. The combination of a plurality of switches, an electrical conducting section connected to one side of each switch, an indicating instrument in said section, a separate branch connected to the other side of each switch, each branch extending from a switch to a separate remote place, and returning to the section on the side of the indicating instrument remote from the switch, a temperature controlled instrument for each branch, and a resistance for each branch varied by said temperature measuring instrument, each switch being independently actuable to throw its branch in series with the section to ascertain readings upon indicating instrument by single action, through a circuit thus closed, and opened by only one manually controllable break in its operation.

7. A temperature reader and recorder for a plurality of remote places comprising an electrical conducting section, an electrical measuring instrument in said section, a branch to each remote place, a temperature measuring instrument and resistance in each branch, said resistance being changed by variations in the temperature measuring instrument, a switch for each branch, a recording device, and a member coacting to control the switch and the recording device.

8. A temperature reader for a plurality of remote places comprising an electrical conducting section, an electrical measuring instrument in said section, an electrical conducting branch for each remote place, a single independent electric switch for each branch, a temperature measuring instrument and electrical resistance in each branch, said resistance being so connected up with the temperature measuring instrument that changes in temperature will vary amount of resistance in the branch, each branch being normally connected to the section at one end on one side of the electrical measuring instrument, extending to a remote place and back to its switch that one mechanical contact may connect it to the section on the opposite side of the electrical measuring instrument, completing electric circuit to give the various readings on the electrical instrument affected by condition at the temperature measuring instrument.

9. A temperature reader for a plurality of remote places comprising an electrical conducting section, an indicating instrument therein, a branch for each remote place, an automatic temperature controlled instrument in each branch, a manually actuable element for each branch completing circuit with the section to give reading of the temperature instrument on the indicating instrument, and locking means preventing closing of other circuits after one is completed by movement of manually actuable element.

In testimony whereof I affix my signature in the presence of two witnesses.

GEO. E. KIRK.

Witnesses:
C. H. RAUCH,
B. S. LEVI.